(12) United States Patent
Ueda et al.

(10) Patent No.: US 6,242,072 B1
(45) Date of Patent: Jun. 5, 2001

(54) HONEYCOMB STRUCTURAL BODY AND PROCESS FOR PRODUCTION OF THE SAME

(75) Inventors: Takeshi Ueda, Kariya; Keiji Ito, Nagoya; Masakazu Murata, Shinshiro; Yoshiyasu Andou, Nagoya; Masakazu Tanaka, Okazaki; Takashi Obata, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/324,117

(22) Filed: Jun. 2, 1999

(30) Foreign Application Priority Data

Jun. 3, 1998 (JP) ................................. 10-154427
Apr. 16, 1999 (JP) ................................. 11-109079

(51) Int. Cl.[7] ......................................... B32B 3/12
(52) U.S. Cl. ................................ 428/116; 264/631
(58) Field of Search ........................ 428/116; 264/631

(56) References Cited

U.S. PATENT DOCUMENTS 4,455,336   6/1984   Ogawa et al. ....................... 428/116

FOREIGN PATENT DOCUMENTS

| 199 25 391 | 12/1999 | (DE) . |
| 228631 | 7/1987 | (EP) . |
| 354053 | 2/1990 | (EP) . |
| 2071639 | 9/1981 | (GB) . |
| 54-110189 | 8/1979 | (JP) . |
| 56-129043 | 10/1981 | (JP) . |
| 61-18438 | 1/1986 | (JP) . |

OTHER PUBLICATIONS

Patent Abstracts of Japan, Production of Open Pore Type Porous Body, vol. 1997, No. 06, Jun. 30, 1997, & JP 09 040478 A (Ishikawajima Harima Heavy Ind Co Ltd), Feb. 10, 1997.

*Primary Examiner*—Francis J. Lorin
(74) *Attorney, Agent, or Firm*—Pillsbury Winthrop LLP

(57) ABSTRACT

There is provided a honeycomb structural body with a lower-than-conventional heat capacity and excellent durability. A honeycomb structural body (1) having partition walls composed mainly of cordierite arranged in a honeycomb fashion is provided with fortified section (2) with a higher strength than the general section (19) at one end or both ends (11) in the direction of length of the partition walls (10). The fortified section (2) is given improved strength by having increased density with respect to the general section.

11 Claims, 14 Drawing Sheets

Fig.3
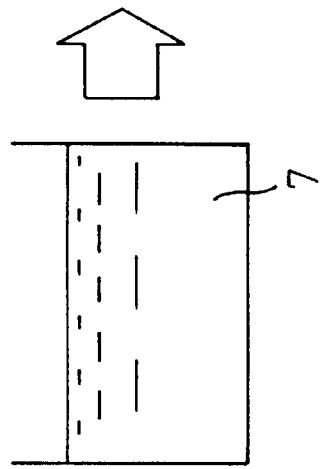
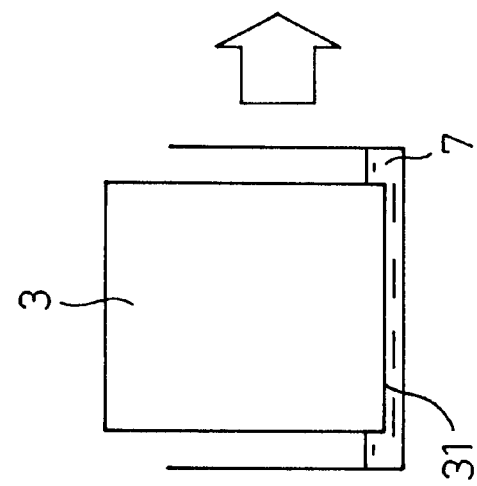
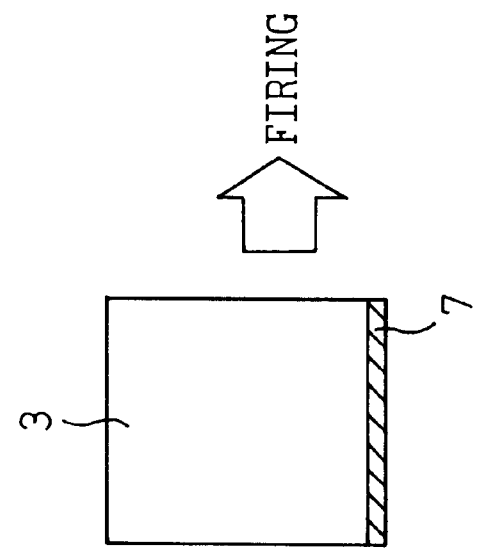

Fig. 9
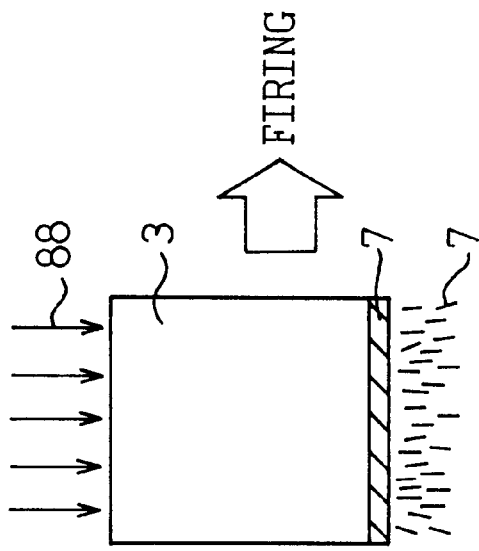
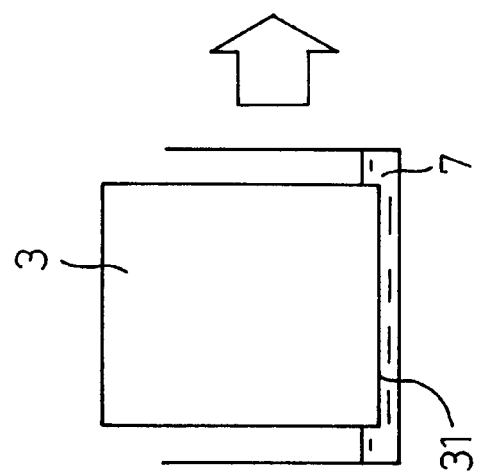
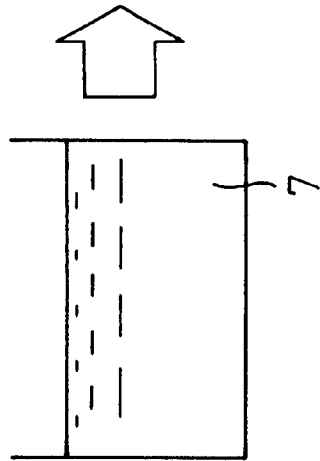

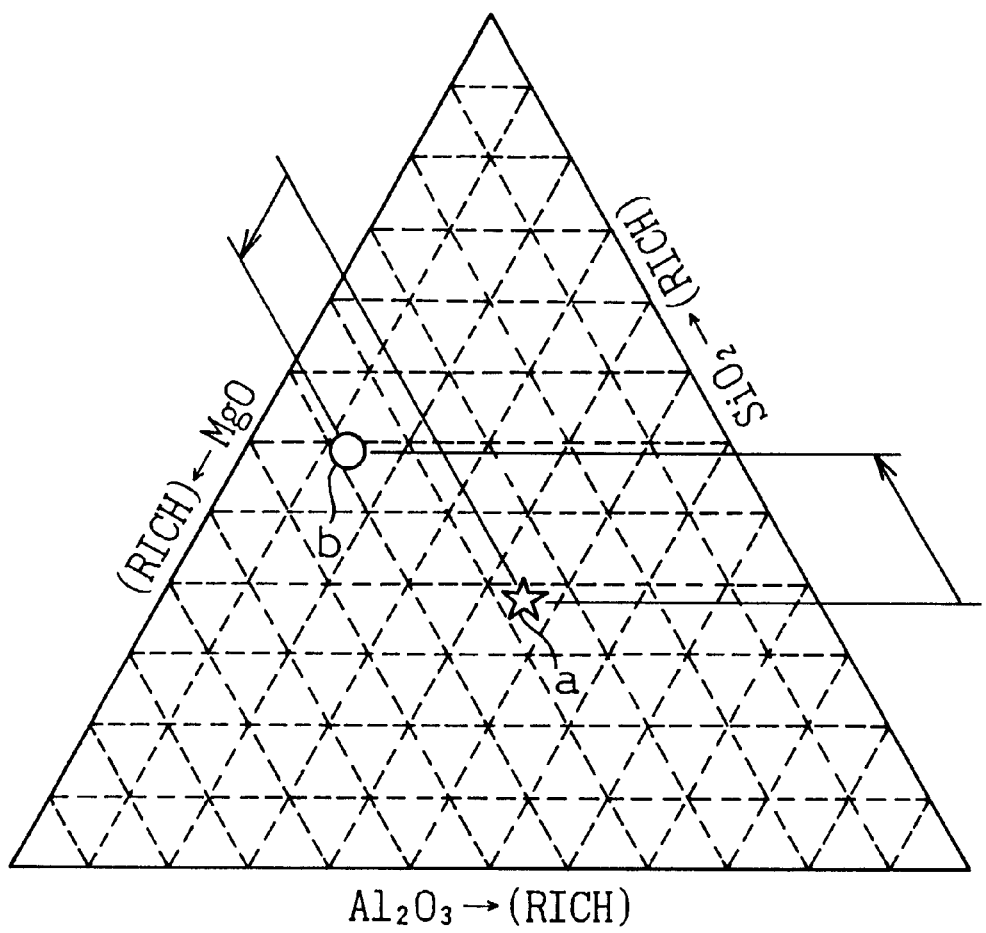

HONEYCOMB STRUCTURAL BODY AND PROCESS FOR PRODUCTION OF THE SAME

BACKGROUND OF THE INVENTION

1. Field of the Invention

The present invention relates to a honeycomb structural body made of cordierite, which is used as a catalyst carrier in an exhaust gas purification apparatus for an internal combustion engine.

2. Description of the Related Art

Catalyst carriers for exhaust gas purification apparatuses have conventionally employed a honeycomb structural body 9 such as shown in FIGS. 15A and 15B, wherein partition walls 90 made of cordierite or the like are arranged in a honeycomb fashion to form multiple cells 99. An exhaust gas purification function is exhibited by carrying an exhaust gas purifying catalyst on the surface of the partition walls 90 of the honeycomb structural body 9.

However, with the enforcement of stricter exhaust gas standards for automobiles in recent years, it has become necessary to achieve more rapid activation of the catalysts in exhaust gas purification apparatuses. Specifically, research has been carried out on lowering heat capacity and pressure loss by reducing the thickness of the partition walls in honeycomb structural bodies. Other studies have focused on moving the position where the catalyst carrier is mounted to be closer to the engine than usual to provide a higher-than-conventional temperature of the exhaust gas to be purified.

These conventional honeycomb structural bodies, however, have been associated with the following problems.

Specifically, when the partition walls of a conventional honeycomb structural body are narrowed to a thickness of about 100 $\mu$m, an inconvenience results as the edges of the honeycomb structural body, i.e. the ends of the partition walls are abraded and damaged by the flow of exhaust gas. It is this narrowing of the partition walls beyond the conventional thickness which is believed to cause the lower partition wall strength and lower durability with respect to exhaust gas flow than is common.

As a strategy for fortifying partition walls when they are narrowed, the overall porosity of the partition walls has been lowered for greater density. However, while this increased density produces a strength-enhancing effect, it has led to such inconveniences as a higher heat capacity due to increased weight of the partition walls or poorer catalyst carrier properties.

In light of these problems of the prior art it is an object of the present invention to provide a honeycomb structural body with a lower-than-conventional heat capacity and excellent durability.

SUMMARY OF THE INVENTION

The first aspect of the invention resides in a honeycomb structural body having partition walls composed mainly of cordierite arranged in a honeycomb fashion, the honeycomb structural body being characterized in that a fortified section with a higher strength than the general section is provided at one or both ends in the direction of length of the partition walls.

Most worthy of note according to the invention is that the aforementioned fortified section is provided at one or both ends in the direction of length of the partition walls.

The fortified section can be provided by various methods including thickening or densification of the walls, and coating or substitution with a fortifying material, as described later.

As mentioned above, the fortified section is provided at one or both ends. When a fortified section is provided at only one end, it is provided at the end on the side with which the exhaust gas impacts when the honeycomb structural body is used as a catalyst carrier.

When provided at both ends, there is no need for directional management of the honeycomb structural body during assembly of the exhaust gas purification apparatus, and therefore production can be accomplished more practically.

The region for formation of the fortified section can be appropriately set based on the size, etc. of the honeycomb structural body. That is, since formation of the fortified section contributes to improved durability of the honeycomb structural body but also brings the disadvantage of greater heat capacity, the region is appropriately set for the intended durability. For example, the fortified section may be formed at the edge in a region of about 1–10 mm from the end of the partition walls.

The major component composing the partition walls is preferred to be cordierite. Cordierite has the general chemical composition $SiO_2$:45–55 wt %, $Al_2O_3$:33–42 wt %, MgO:12–18 wt %.

The function of the present invention will now be explained.

As mentioned above, the honeycomb structural body of the invention has a fortified section provided at an end of the partition walls. Consequently, when the honeycomb structural body is used as a catalyst carrier it is possible to vastly improve the durability of the partition walls against the flow of exhaust gas, as compared to the prior art.

That is, when the honeycomb structural body is used as a catalyst carrier, the exhaust gas first impacts with the partition walls of the honeycomb structural body. Because fortified section is provided at the end of the partition walls as explained above, they are stronger than the general section. Consequently, they have greatly improved durability against an exhaust gas flow as compared to honeycomb structural bodies of the prior art which possess no fortified section. This means that the overall thickness of the partition walls can be made narrower than according to the prior art, while maintaining durability against the flow of exhaust gas.

The fortified section is provided only at an end of the partition walls. Consequently, even with an increase in heat capacity owing to formation of the fortified section, the region of increase is limited only to the end where the fortified section has been formed. As a result, when the heat capacity is lowered by narrowing of the partition walls, etc., an adequate effect of reduced heat capacity can be achieved at the general section, so that the overall heat capacity of the honeycomb structural body can be vastly reduced with respect to the prior art. In other words, it is possible to achieve both reduced heat capacity by narrowing, and improved durability.

Consequently, according to the present invention there is provided a honeycomb structural body with a lower-than-conventional heat capacity and excellent durability.

The fortified section is preferably provided with improved strength by an increased density with respect to the general sections. That is, partition walls composed mainly of cordierite are usually formed in a porous state having numerous pores in the interior. It is thus possible to reduce the porosity at one or both of the ends of the partition walls with respect to the general section for increase in the density of the fortified section.

Since in such a case the fortified section can be provided without greatly increasing the partition wall thickness, it is possible to prevent an increase in resistance to passage of exhaust gas.

The increase in density described above is preferably accomplished so that the porosity is in the range of 5–35%. If the porosity is less than 5% the strength is improved but the thermal shock resistance may be impaired. On the other hand, if it exceeds 35% a problem arises in that the effect of improved strength at the fortified sections is reduced.

The process for forming the fortified section by increase in density may be a process whereby a portion of the starting material for the partition walls is coated and fired onto the partition walls after extrusion molding of the honeycomb structural body, as explained in the embodiments which follow.

The fortified section can be given enhanced strength by making them thicker than the general section. In this case as well, it is possible to fortify only the end in the manner described above, and to simultaneously obtain the two effects of lower heat capacity and improved durability.

Thickening of the end in such cases is carried out in a balanced fashion so as not to overly increase the resistance to the passage of an exhaust gas.

The thickening is preferably carried out to achieve a 20–400% greater thickness than the general section. This method is particularly preferred in cases where the original thickness of the partition walls is 150 $\mu$m or less. At greater than 400% thickening the resistance to passage of exhaust gas may become too high, while at less than 20% the effect of improved strength of the fortified section will be minimal.

As a more concrete explanation, for example, satisfactory results can be achieved at 130–200 $\mu$m when the original partition wall thickness is 100 $\mu$m, at 100–160 $\mu$m when it is 75 $\mu$m, at 90–160 $\mu$m when it is 50 $\mu$m and at 60–120 $\mu$m when it is 30 $\mu$m.

The process for forming the fortified section by thickening may be a process whereby the same material as the starting material for the partition walls is coated and fired onto the partition walls after extrusion molding of the honeycomb structural body, as explained in the embodiments which follow.

The fortified section is preferably constructed in such a fashion that the strength gradually increases toward the edges of the partition walls. Specifically, for example when the fortified section is formed by increase in density as described above, it is preferred to form the fortified section so as to have a gradually reducing porosity for gradually increased strength from the general section toward the edge. In the case of thickening as well, it is preferred to form the fortified section so that the thickness gradually increases from the general section toward the edge.

In such cases, if the transition between the fortified section and the general section is smoothed out it is possible to avoid stress concentration and thus further improve the effectiveness of the fortified section. In addition, the gradually narrowing wall thickness will allow a smoother gas flow, thus contributing to improved durability from this standpoint as well.

The fortified section is preferably formed over a portion of 50–100% of the end appearing at the edge in the honeycomb structural body. That is, the fortified section does not necessarily need to be formed at all of the ends of the partition walls. Nevertheless, it is preferred for the fortified section to be formed on at least a portion of 50% of the end appearing at the edge in the honeycomb structural body. At less than 50% a problem occurs in that it is not possible to adequately exhibit the effect of the fortified section which is formed.

According to the second aspect of the present invention there is provided a process for producing a honeycomb structural body which comprises forming partition walls composed mainly of cordierite in a honeycomb fashion and providing a fortified section with more enhanced strength than the general section at one or both ends in the lengthwise direction of the partition walls, the process for producing the honeycomb structural body being characterized in that a mixed slurry is prepared wherein a melting point-lowering component which lowers the melting point of cordierite has been mixed in a medium, and the mixed slurry is adhered to the end of the honeycomb structural body and then fired to form a fortified section at the end which is denser than the general section.

The melting point-lowering component which lowers the melting point of the cordierite is a component which exhibits an effect of lowering the melting point of the cordierite when its proportional content in the cordierite is increased. Specifically, the component is talc, alumina, kaolin or a mixture thereof constituting a portion of the starting material composing the cordierite. However, they are not all used in admixture. This will not permit an adequate effect of lowering the melting point of the cordierite.

Impurity components such as iron and titanium may also be used in the cordierite. Increasing the amount of addition of such impurities can also lower the melting point of the cordierite.

The medium used for the aforementioned mixed slurry may be any of various mediums, including water-soluble mediums such as water, and non-water-soluble organic mediums.

The honeycomb structural body to which the mixed slurry is adhered may be simply dried after extrusion molding, or it may be fired after drying.

However, as will be explained below, a preferred medium may also be selected depending on the condition of the honeycomb structural body.

The method employed for adhesion of the mixed slurry to the honeycomb structural body may any of various methods including dipping, spraying and the like. Specifically, such methods include a method wherein the mixed slurry is poured into a container and the honeycomb structural body is immersed therein, and a spraying method wherein the mixed slurry is sprayed onto the end of the honeycomb structural body.

In the spraying method described above, for example a sprayer is positioned in a direction oblique to the edge of the honeycomb structural body, and is rotated relative to it while spraying the mixed slurry, to adhere the mixed slurry to the ends of the partition walls.

The function and effect of this production process will now be explained.

According to this production process, firing is accomplished after adhesion of the mixed slurry to the ends of the honeycomb structural body. It increases density of the ends of the partition walls to which the mixed slurry has been adhered by giving them a lower porosity, converting them to fortified sections having a higher strength than the general sections.

The mechanism of this phenomenon can be considered as follows.

That is, the mixed slurry contains the aforementioned melting point-lowering component. As a consequence, when firing is accomplished the melting point of the cordierite is lowered at the sections contacting the melting point-lowering component, resulting in its partial melting even at the burning temperature. The melted portions thus penetrate into the pores, filling them. Consequently, the ends of the partition walls to which the mixed slurry has been adhered have a lower porosity than the general sections, and are therefore more dense and have improved strength.

This production process can therefore be used for easy fortification by increase in density of the ends of the partition walls.

According to the third aspect of the present invention there is provided a process for producing a honeycomb structural body which comprises forming partition walls composed mainly of cordierite in a honeycomb fashion and providing a fortified section with higher strength than the general section at one or both ends in the lengthwise direction of the partition walls, the process for producing the honeycomb structural body being characterized in that a mixed slurry is prepared wherein a starting material composing the cordierite has been mixed in a medium, and the mixed slurry is adhered to the end of the honeycomb structural body and then fired to form fortified section at the end which have been thickened with respect to the general section.

According to this production process, the mixed slurry is prepared using a starting material composing the cordierite, i.e. a starting material which is converted to cordierite when the mixed components are fired, as a component which is mixed with the mixed slurry. As specific examples, mixtures of talc, alumina and kaolin may be used.

In this production process, the firing is accomplished with the mixed slurry adhered to the ends of the partition walls of the honeycomb structural body.

In this case, since the component included in the mixed slurry is a component which is converted to cordierite, the firing forms a new cordierite layer around the ends of the partition walls. Consequently, the end of the honeycomb structural body is thickened with respect to the general section, and thus have improved strength.

This production process can therefore be used for easy fortification by thickening of the ends of the partition walls.

According to the second and third aspects described above, it is preferred for adhesion of the mixed solution to the ends to be followed by an excess slurry removal step whereby the excess adhered mixed slurry is removed. Here, removal of the excess mixed slurry which has been adhered to the ends can result in a more uniform coverage of the mixed slurry on the ends. The increase of density or thickening can therefore be accomplished more evenly.

The excess slurry removal step may employ any of various methods, such as an air blower method whereby air is blown from the side opposite the end of the honeycomb structural body after the mixed slurry has been adhered onto an end, a suction method whereby the excess mixed slurry is suctioned from the side of an end onto which the mixed slurry has been adhered, and an adsorption method whereby adsorption paper or the like is placed on an end onto which the mixed slurry has been adhered, for adsorption removal of the excess mixed slurry.

When the honeycomb structural body to which the mixed slurry is to be adhered is an unfired dry body, the aforementioned medium of the mixed slurry is preferably a non-water-soluble organic medium. This can minimize excess adsorption of the mixed slurry to the honeycomb structural body, thus reliably preventing inconveniences such as damaging of the shape of the honeycomb structural body.

When the honeycomb structural body to which the mixed slurry is to be adhered is a fired body which has been previously fired, the medium of the mixed slurry is preferably water. This makes it possible to reduce the cost of the medium, and facilitate its handling.

When the honeycomb structural body to which the mixed slurry is to be adhered is a fired body such as mentioned above, the firing temperature after adhesion of the mixed slurry can be lower than the originally intended temperature for firing alone.

BRIEF DESCRIPTION OF THE DRAWINGS

FIG. 3 is an illustration of a production procedure for a honeycomb structural body according to Embodiment 1.

FIG. 9 is an illustration of the production procedure for a honeycomb structural body according to Embodiment 5.

FIG. 14 is a graph showing component composition changes due to formation of fortified sections according to Embodiment 8.

DESCRIPTION OF THE PREFERRED EMBODIMENTS

Embodiment 1

A honeycomb structural body according to an embodiment of the invention will now be explained with reference to FIGS. 1 to 4.

Figure 1A:
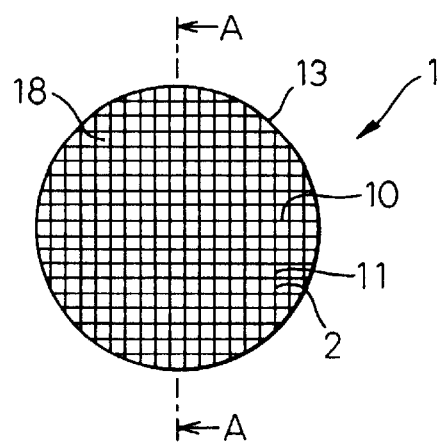
FIGS. 1A, 1B and 1C are, respectively, a front view (1A), side view (1B) and cross-sectional view on arrow A—A (1C) of a honeycomb structural body according to Embodiment 1.
Figure 1B:
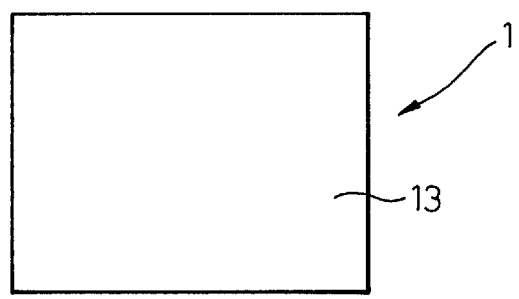

As shown in FIG. 1, the honeycomb structural body 1 of this embodiment is a honeycomb structural body wherein partition walls 10 composed mainly of cordierite are arranged in a honeycomb fashion in a cylindrical casing 13.

Figure 1C:
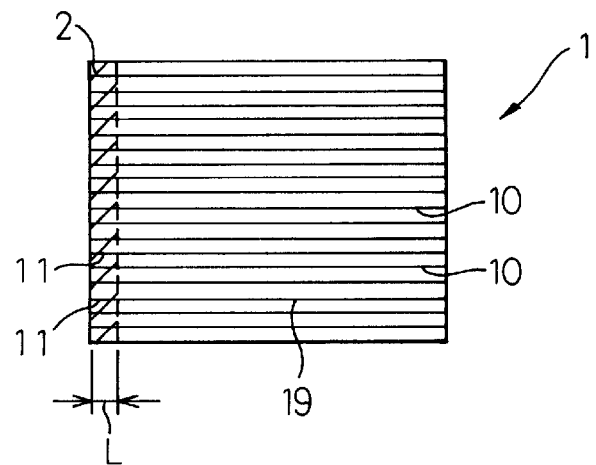

As shown in FIG. 1C, fortified section 2 is formed at one of the ends 11 in the lengthwise direction of the partition walls 10, providing improved strength over the general section 19.

The fortified section 2 has improved strength by being increased in density than the general section 19.

This will now be explained.

As seen in FIG. 1A, the honeycomb structural body 1 of this embodiment has partition walls 10 arranged in a honeycomb fashion, with numerous cells 18 in the shape of squares with sides of about 1.27 mm. The thicknesses of the general sections 19 and fortified sections 2 of the partition walls are both about 100 $\mu$m when finished. The length L of the fortified sections 2 is about 5 mm when finished.

Figure 2A:
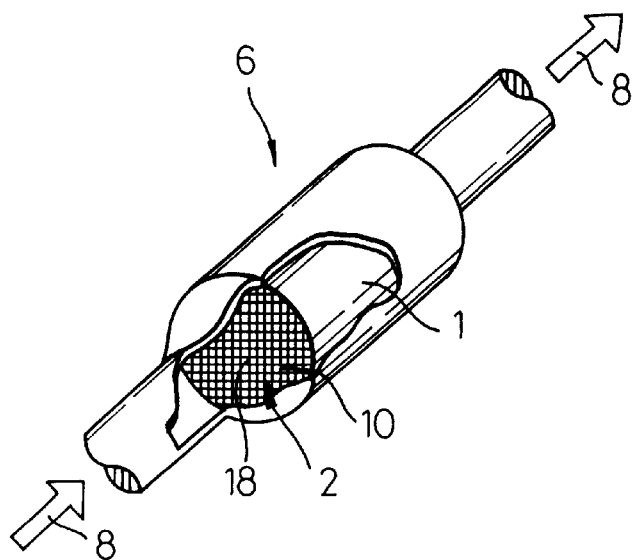
FIGS. 2A and 2B are illustrations of, respectively, a honeycomb structural body according to Embodiment 1 incorporated in an exhaust gas purification apparatus and an expanded view of a cell of the same.
Figure 2B:
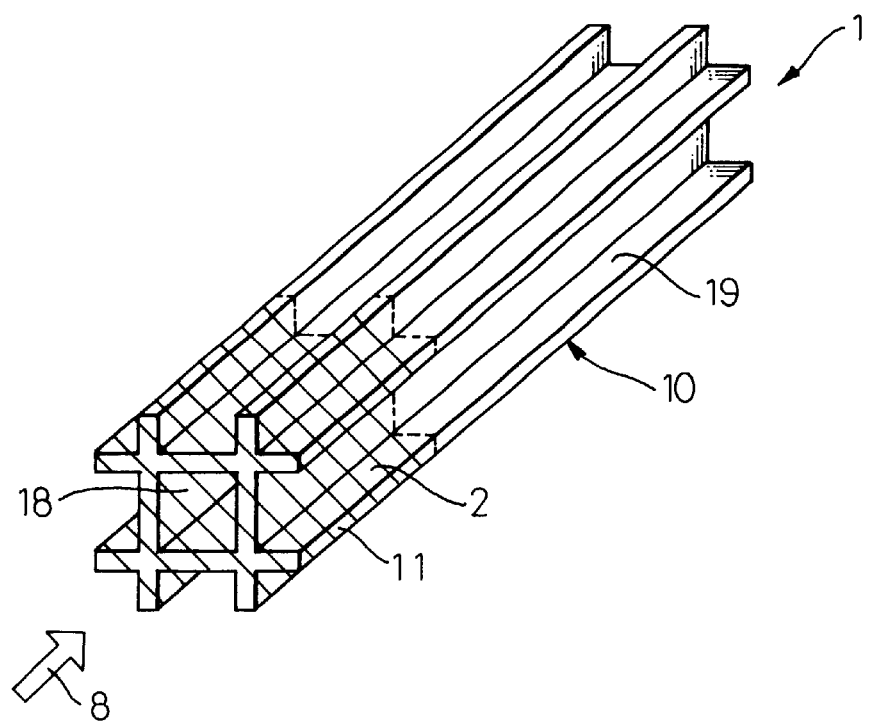

As seen in FIG. 2A, the honeycomb structural body 1 is situated carrying a catalyst inside an exhaust gas purification apparatus 6. Exhaust gas 8 is passed from one of the edges of the honeycomb structural body 1 for purification. As shown in FIG. 2B, the honeycomb structural body 1 situated in the exhaust gas purification apparatus 6 has its fortified sections 2 placed at the side where the exhaust gas 8 enters. As shown in FIGS. 2A and 2B, the exhaust gas 8 is purified by passing through the cells 18 formed by the partition walls 10 of the honeycomb structural body 1.

For production of this type of honeycomb structural body 1, a starting material composed mainly of cordierite is first used for extrusion molding. The extrusion molded product is then dried to obtain a honeycomb-shaped dry body 3.

The following process is carried out using the dry body 3 to form the fortified sections of the partition walls.

As shown in FIG. 3(a), there is first prepared a mixed slurry 7 comprising a mixture of a binder and water with talc as a melting point-lowering component to lower the melting point of the cordierite. The talc can be replaced with, for example, another material in the cordierite, or an impurity among the cordierite components, etc.

Next, as shown in FIG. 3(b), one end 31 of the dry body 3 is immersed in the mixed slurry 7 facing downward. Here, the immersed length is adjusted to be the length for formation of the fortified section 2.

Figure 4A:
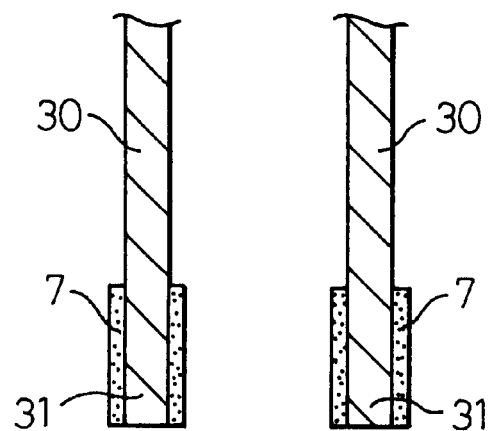
FIGS. 4A and 4B are illustrations according to Embodiment 1 showing, respectively, the partition walls coated with a mixed slurry and the same after firing.

Thus, as shown in FIGS. 3(c) and 4A, the ends 31 of the partition walls 30 of the dry body 3 are coated with the mixed slurry 7.

Figure 4B:
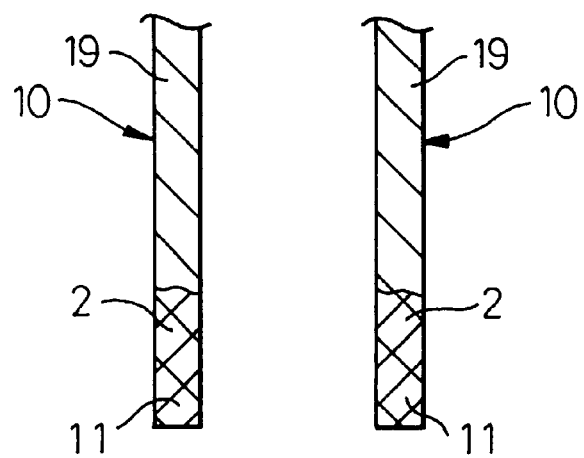

The dry body 3 is then fired. Thus, as shown in FIG. 4B, the partition walls 30 of the dry body 30 are fired to become the partition walls 10, while each end 11 coated with the mixed slurry 7 becomes a denser fortified section 2 without being thickened, as a result of the action of the melting point-lowering component included in the mixed slurry 7.

The fortified section 2 has a porosity of 30%, and is thus much more increased in density than the general section 19 which has a porosity of 36%.

In this embodiment a dry body 3 was used for formation of the fortified sections 2, but fortified sections 2 can also be formed in the same manner even if the dry body 3 is instead an already fired honeycomb structural body.

The honeycomb structural body 1 of this embodiment has fortified section 2 formed at the ends 11 of the partition walls 10. As explained above, the fortified section 2 have improved strength through greater density than the general section 19. Consequently, adequate durability is exhibited even if the thickness of the partition walls 10 is narrowed to about 100 $\mu$m.

That is, when the partition walls of a conventional honeycomb structural body are narrowed to about 100 $\mu$m, the durability is drastically reduced. Also, upon actual use as a catalyst carrier in an exhaust gas purification apparatus, the ends of the partition walls often suffers damage from the pressure of the exhaust gas flow.

In contrast, the honeycomb structural body 1 of this embodiment sufficiently withstands the pressure of exhaust gas flow and avoids damage, despite the fact that the thickness of the partition walls 10 is narrowed to about 100 $\mu$m. As mentioned above, this is because it is fortified by provision of the fortified sections 2 at the ends 11 of the partition walls 10 with which the exhaust gas impacts.

Consequently, such narrowing allows the honeycomb structural body 1 of this embodiment to have lower heat capacity than the prior art, while the durability of the partition walls 10 is also improved. This contributes to faster activation of the catalyst in the exhaust gas purification apparatus.

Embodiment 2

This embodiment is an example where the ends 11 of the partition walls 10 of the honeycomb structural body 1 of Embodiment 1 are fortified by thickening.

Figure 5A:
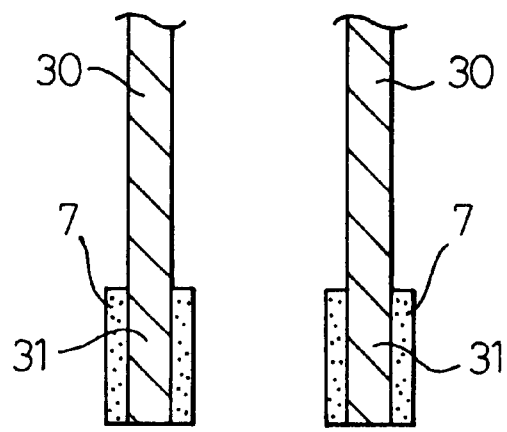
FIGS. 5A and 5B are illustrations according to Embodiment 2 showing, respectively, the partition walls coated with a mixed slurry and the same after firing.
Figure 5B:
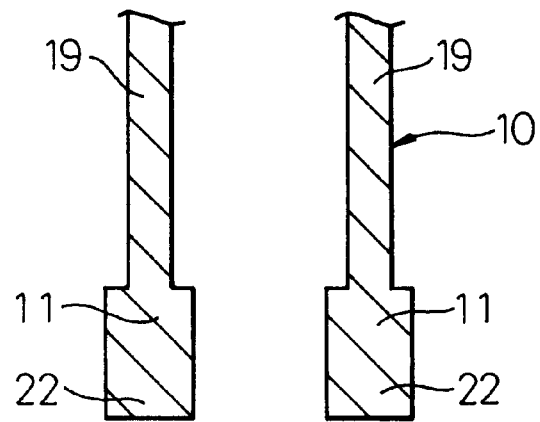

That is, as shown in FIG. 5B, the honeycomb structural body of this embodiment has thickened fortified sections 22 provided at the ends 11 of the partition walls 10.

Specifically, a dry body 3 is prepared in the same manner as Embodiment 1, and fortified sections 22 are formed in the following manner.

First, a mixed slurry 7 comprising a mixture of a binder and water with the starting material composing the cordierite of the honeycomb structural body 1 (a desired mixture of talc, alumina and kaolin) is prepared in advance as a fortifying material.

Next, one end 31 of the dry body 3 is immersed in the mixed slurry facing downward in the same manner as Embodiment 1 as shown in FIG. 3 (b). Here, the immersed length is adjusted to be the length for formation of the fortified section 2. Thus, as shown in FIG. 5A, the end 31 of the partition walls 30 of the dry body 3 is coated with the mixed slurry 7.

The dry body 3 is then fired.

Thus, the partition walls 30 of the dry body 30 are fired to become the partition walls 10, while each end 11 coated with the mixed slurry 7 becomes a thickened fortified section 22.

The fortified sections 22 have a thickness of 130 $\mu$m, which is 30% thicker than the general sections 19 which have a thickness of 100 $\mu$m.

In this embodiment a dry body 3 was used for formation of the fortified section 2, but fortified sections 22 can also be formed in the same manner even if the dry body 3 is instead an already fired honeycomb structural body.

In this embodiment, too, the presence of the fortified sections 22 thickened in the manner described above allows the partition walls 10 to be narrower overall, while maintaining the durability of the partition walls 10. The fortified sections 22 have a slight thickening of only 30%, and only in a narrow range of 5 mm length from the tip ends of the partition walls. Consequently, formation of the fortified sections 22 does not significantly increase the resistance to passage of exhaust gas.

The other effects obtained are the same as those of Embodiment 1.

Embodiment 3

This embodiment is an example where the shape of the fortified sections of Embodiment 2 is altered, as shown in FIG. 6, the fortified sections 23 being formed with gradually increasing thickness in such a manner that the strength gradually increases toward the end.

Figure 6A:
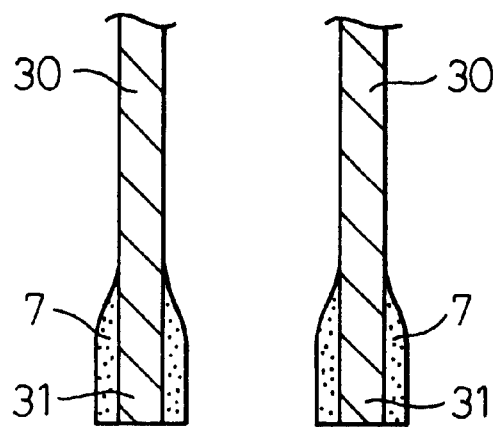
FIGS. 6A and 6B are illustrations according to Embodiment 3 showing, respectively, the partition walls coated with a mixed slurry and the same after firing.
Figure 6B:
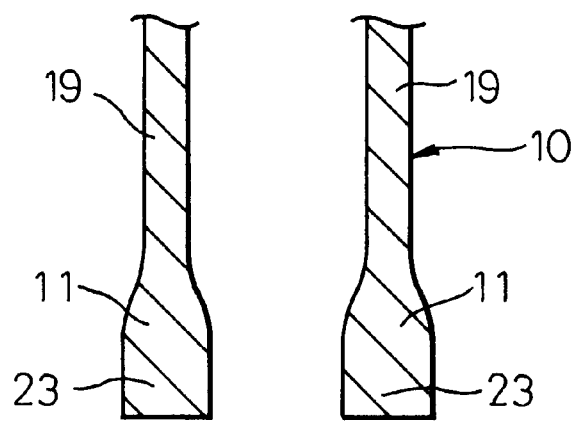

That is, as shown in FIG. 6A, the mixed solution 7 is adhered in such a manner that the coated mixed slurry 7 gradually increases in thickness, and drying is accomplished as for Embodiment 2. As shown in FIG. 6B, this gives fortified sections 23 with gradually increasing thickness. The other aspects are identical to Embodiment 2.

Figure 7A:
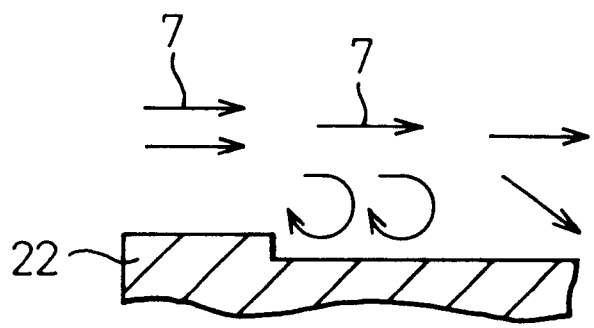
FIG. 7 is an illustration of the effect of improved exhaust gas flow according to Embodiment 3.
Figure 7B:
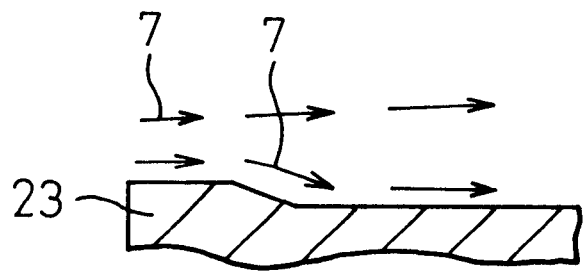

As shown in FIG. 7B, the fortified sections 23 of this embodiment allows a smoother flow of exhaust gas 8 than the fortified sections 22 of Embodiment 2 (FIG. 5B), thus providing improved durability.

The other effects obtained are the same as those of Embodiment 2.

Embodiment 4

Figure 8A:
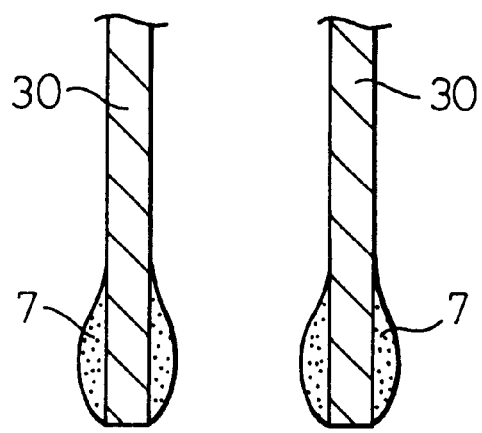
FIGS. 8A and 8B are illustrations according to Embodiment 4 showing, respectively, the partition walls coated with a mixed slurry and the same after firing.
Figure 8B:
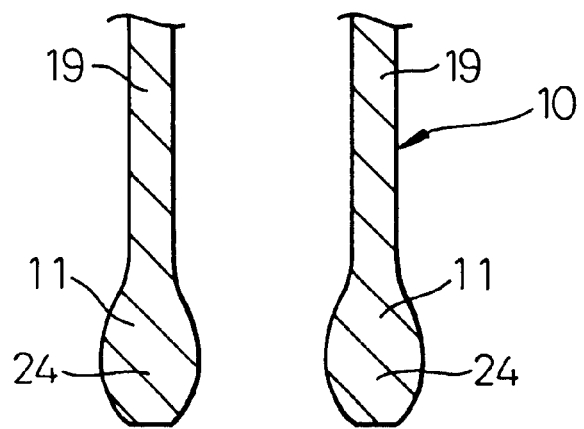

This embodiment is an example where fortified sections 24 are formed in such a manner that the thickness is reduced at the tip ends of the fortified sections in Embodiment 3, for an overall streamlined shape, as shown in FIG. 8. The other aspects are identical to Embodiment 3.

This allows an even smoother flow of exhaust gas.

The other effects obtained are the same as those of Embodiments 2 and 3.

Embodiment 5

This embodiment will be used to explain a process for producing a honeycomb structural body with a partition wall thickness of 75 μm which is fortified by increase in density of the ends.

In this embodiment, as shown in FIG. 9, a mixed slurry 7 was prepared comprising talc as a component to lower the melting point of the cordierite, mixed at 30 wt % with AF medium #6 (product of Nippon Oil, Co. Ltd.) as a non-water-soluble organic solvent (FIG. 9(a)), and the mixed slurry 7 was adhered to an end 31 of the honeycomb structural body which was an unfired dry body 3, this being followed by firing. This formed fortified sections 2 at the ends 11 of the fired partition walls 10, which were more increased in density than the general sections 19 (see FIG. 4).

This will now be explained more fully.

The dry body 3 was obtained by first kneading the cordierite starting material and extrusion molding it into a honeycomb shape, and then drying it. Next, as shown in FIG. 9(b), the dry body 3 was immersed in the mixed slurry 7. The immersion depth was 2 mm from the edge.

Then, as shown in FIG. 9(c), an air blower was used to blow air 88 at a pressure of 1 kgf/mm² from the edge of the dry body 3 on the side opposite the end 31 to which the mixed slurry 7 was adhered. This removed the excess adhered mixed slurry 7 to produce a more even adhesion of the mixed slurry 7.

The dry body 3 was then fired. As in Embodiment 1, this formed fortified sections 2 at the ends 11 of the partition walls 10, which were more increased in density than the general sections 19.

Figure 10:
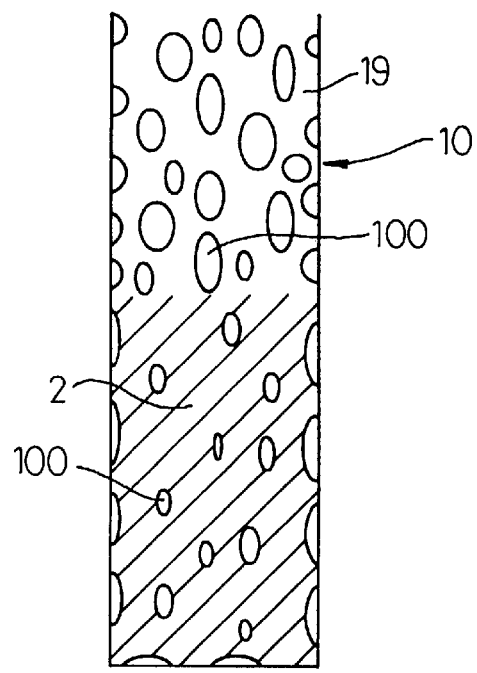
FIG. 10 is an illustration of the internal structure of a general section and a fortified section in a partition wall according to Embodiment 5.

The configurational state of the partition walls of the resulting honeycomb structural body of this embodiment was then observed. The results are shown schematically in FIG. 10.

As can be seen in this drawing, the partition walls 10 of the honeycomb structural body of this embodiment have fortified sections 2 present within about 2 mm of the ends 11, wherein the pores 100 are reduced with respect to the general sections 19, resulting in increase in density. Upon evaluating the densification based on the porosity, the porosity of the fortified sections was found to be 25%, compared to 35% porosity in the general sections. It can also be seen that the density-increased fortified sections 2 have the same thickness as the general sections 19.

For this embodiment, the effect of improved strength by provision of the fortified sections 2 in the resulting honeycomb structural body (designated as the invention product E1) was quantitatively evaluated. For comparison, a honeycomb structural body of the same size with no fortified sections (designated as the comparison product C1) was prepared and evaluated in the same manner.

Figure 11:
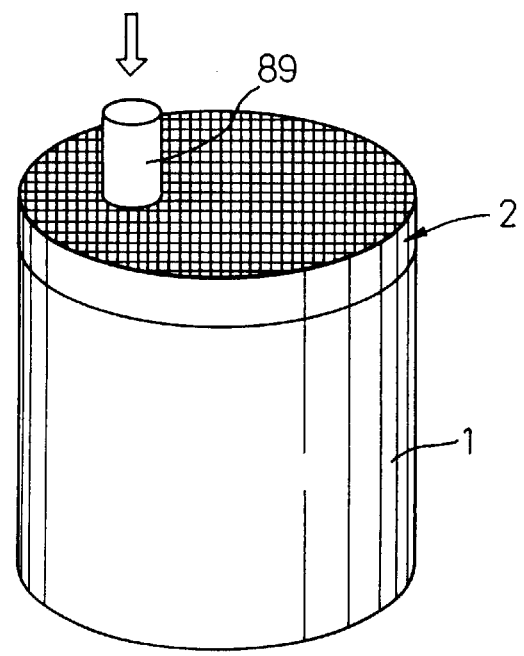
FIG. 11 is an illustration of a method of measurement of the edge strength according to Embodiment 5.

The strength was evaluated in the following manner. First, as shown in FIG. 11, an 8-mm diameter cylindrically shaped SUS member 89 was placed on the end of the honeycomb structural body 1 and a load was applied thereto, and the load W at which the end fractured was determined. The value of the base area of the SUS member 89 divided by this load W (W/A [MPa]) was recorded as the edge strength.

The measurement resulted in an edge strength of over 8.4 MPa for the invention product E1, which was about 70% greater than the edge strength of the comparison product C1.

Embodiment 6

For this embodiment, the relationship between the depth of the fortified sections 2 at the ends 11 (distance from the edges) and the edge strength was determined based on Embodiment 5.

Specifically, the immersion depth of the dry body 3 in the mixed slurry 7 for Embodiment 5 was changed to 1, 4, 6, 8, 10 and 12 mm, and the edge strengths of the resulting honeycomb structural bodies were measured in the same manner as Embodiment 5.

Figure 12:
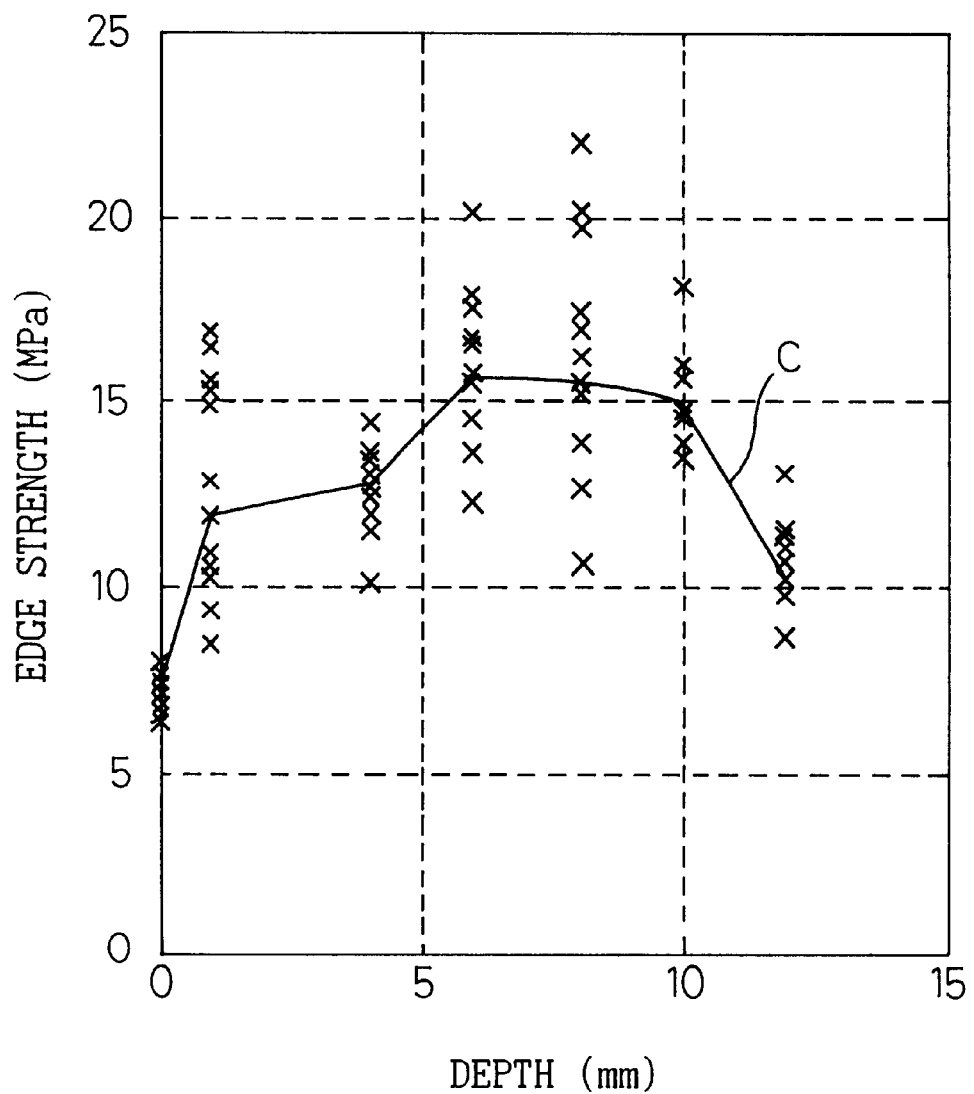
FIG. 12 is a graph showing the relationship between depth of the fortified sections and edge strength according to Embodiment 6.

The measurement results are shown in FIG. 12. This graph shows the depth (mm) of the fortified sections plotted on the horizontal axis and the edge strength (MPa) on the vertical axis. The results of multiple measurements are plotted with the symbol "x", and the mean values are connected with a solid line C.

As seen in this graph, when the thickness of the partition walls 10 is 75 μm as according to this embodiment, a notable effect of improved edge strength is obtained when the depth of the fortified sections 2 is in the range of 2–10 mm, and especially 5–10 mm.

Embodiment 7

For this embodiment, the relationship between the talc concentration of the mixed solution 7 and the strength-improving effect of the fortified sections 2 was determined based on Embodiment 5.

Specifically, the talc concentration of the mixed slurry 7 for Embodiment 5 was changed to 10, 15, 20, 25, 27.5, 30, 32.5 and 35 wt %, and the edge strengths of the resulting honeycomb structural bodies were measured in the same manner as Embodiment 5.

Figure 13:
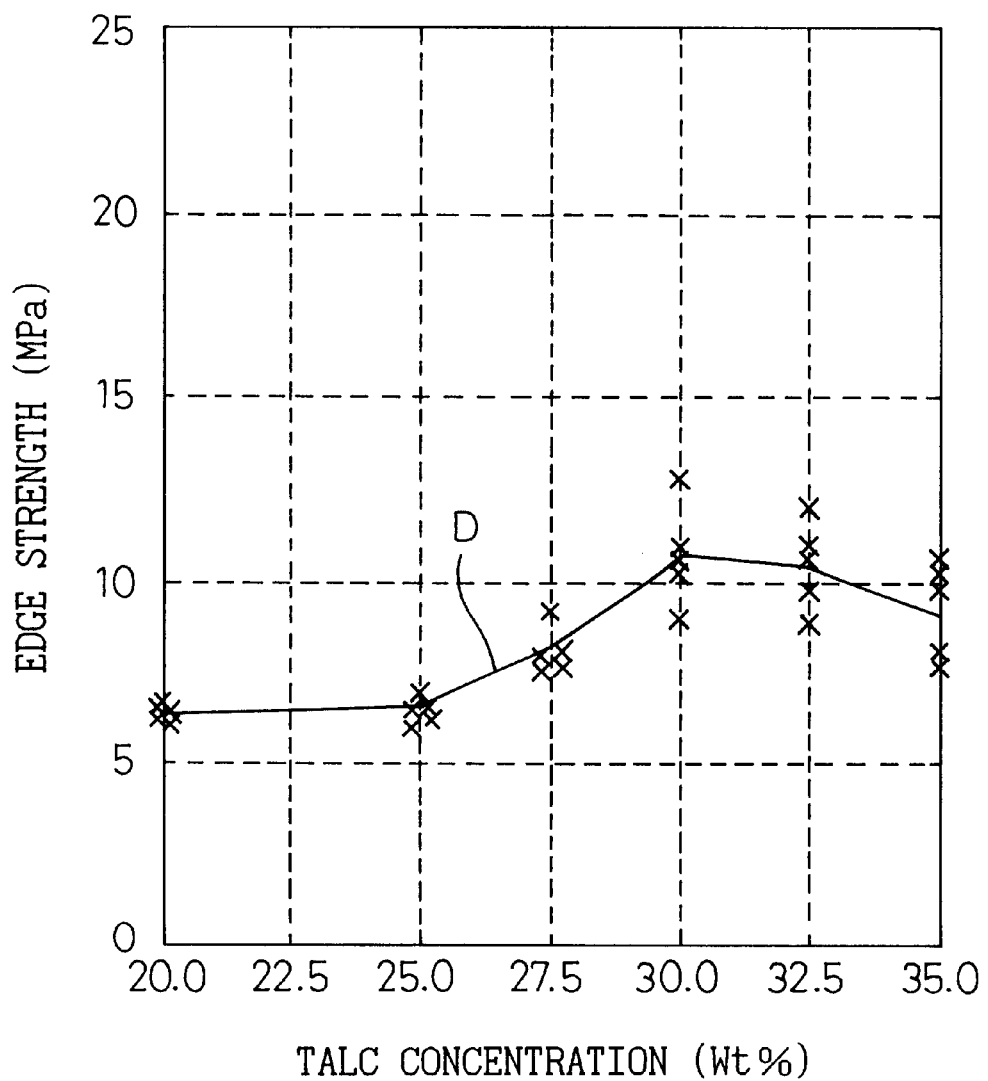
FIG. 13 is a graph showing the relationship between talc concentration in the mixed slurry and edge strength according to Embodiment 7.
Figure 15A:
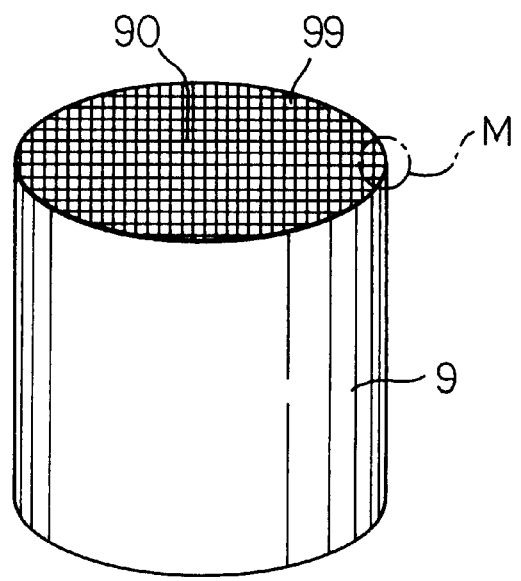
FIGS. 15A and 15B are, respectively, a perspective view and an enlarged view of section M of a honeycomb structural body according to the prior art.
Figure 15B:
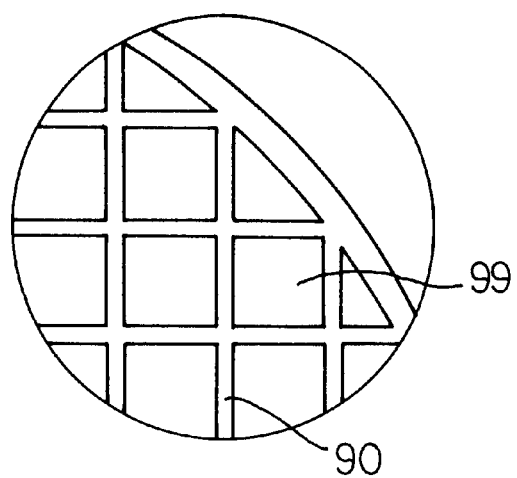

The measurement results are shown in FIG. 13. This graph shows the talc concentration (wt %) plotted on the horizontal axis and the edge strength (MPa) on the vertical axis. The results of multiple measurements are plotted with the symbol "x", and the mean values are connected with a solid line D.

As seen in this graph, when the talc concentration is in the range of 28–33 wt % as according to this embodiment, a particularly notable effect of improved edge strength is obtained.

Embodiment 8

For this embodiment, compositional changes in the fortified sections 2 obtained according to Embodiment 5 were examined. Specifically, the component composition of the general sections 19 and the component composition of the fortified sections 2 of the partition walls 10 were examined.

The results are shown in FIG. 14. In this drawing, the composition of the cordierite is shown as a three-dimensional state diagram of the 3 components, $Al_2O_3$, $SiO_2$ and MgO. The composition (a) of the general sections 19 is indicated by the symbol "☆" and the composition (b) of the fortified sections 2 is indicated by the symbol "○".

As seen in this drawing, the composition of the fortified sections 2 changed to a composition richer in MgO and $SiO_2$ by the influence of talc in the mixed solution 7, described above. Also, the composition (b) of the fortified sections was a composition with a lower melting point than composition (a) of the general sections 19. These results indicate that the presence of the melting point-lowering component in the mixed slurry 7 shifted the composition of the cordierite to one with a lower melting point, thus providing an increase in density and improving the strength of the fortified sections 2.

Needless to mention, the shape of the honeycomb structural body lattice is not limited to a square shape and may be hexagonal, triangular or any other shape.

What is claimed is:

1. A honeycomb structural body having partition walls composed mainly of cordierite arranged in a honeycomb fashion, the honeycomb structural body having at least one end being characterized in that a fortified section with more enhanced strength than a general section is provided at the at least one end in the direction of length of said partition walls, the thickness of the partition walls in the general section is 150 $\mu$m or less, and the fortified section is formed over a portion of 50 to 100% of the at least one end appearing at the edge of said honeycomb structural body.

2. The honeycomb structural body according to claim 1, wherein the fortified section is provided only at the at least one end in the direction of length of said partition walls.

3. The honeycomb structural body according to claim 1, characterized in that said fortified section has improved strength due to its greater density with respect to said general section.

4. The honeycomb structural body according to claim 3, characterized in that said greater density reduces its porosity to the range of 5–35%.

5. The honeycomb structural body according to claim 1, characterized in that said fortified section has improved strength by thickening with respect to said general section.

6. The honeycomb structural body according to claim 5, characterized in that said thickening is accomplished to 20–400% greater thickness than said general section.

7. The honeycomb structural body according to claim 1, characterized in that said fortified section has a construction wherein the strength gradually improves toward the edges of said partition walls.

8. A process for producing a honeycomb structural body having at least one end comprising:

forming partition walls composed mainly of cordierite in a honeycomb fashion; and providing a fortified section at the at least one end with more enhanced strength than a general section in the direction of length of said partition walls, the process for producing the honeycomb structural body being characterized in that a mixed slurry is prepared wherein a melting point-lowering component which lowers the melting point of cordierite has been mixed in a slurry, wherein the slurry is a non-water soluble organic slurry and said mixed slurry is adhered to the end of the honeycomb structural body, wherein the honeycomb structural body is an unfired dry body and then fired to form fortified section at said end which is more dense than said general section.

9. The process for producing a honeycomb structural body according to claim 8, characterized in that the adhesion of said mixed slurry onto said end is followed by an excess slurry removal step whereby the mixed slurry which has been adhered in excess is removed.

10. A process for producing a honeycomb structural body having at least one end, comprising:

forming partition walls composed mainly of cordierite in a honeycomb fashion; and providing a fortified section at the at least one end with greater strength than a general section in the direction of length of said partition walls, the process for producing the honeycomb structural body being characterized in that a mixed slurry is prepared wherein a starting material composing the cordierite has been mixed in a mixture wherein said mixture is a non-water soluble organic mixture, and said mixed slurry is adhered to the at least one end of the honeycomb structural body wherein the honeycomb structural body is an unfired dry body and then fired to form a fortified section at said end which has been thickened with respect to said general section.

11. The process for producing a honeycomb structural body according to claim 10, characterized in that the adhesion of said mixed solution onto said end is followed by an excess solution removal step whereby the mixed solution which has been adhered in excess is removed.

* * * * *